United States Patent [19]

Kalinoski et al.

[11] Patent Number: 5,003,827
[45] Date of Patent: Apr. 2, 1991

[54] PIEZOELECTRIC DIFFERENTIAL PRESSURE VORTEX SENSOR

[75] Inventors: Richard W. Kalinoski, Rumford, R.I.; Gordon W. Chitty, Norfolk; James H. Vignos, Needham Heights, both of Mass.

[73] Assignee: The Foxboro Company, Foxboro, Mass.

[21] Appl. No.: 455,058

[22] Filed: Dec. 22, 1989

[51] Int. Cl.⁵ .............................................. G01F 1/32
[52] U.S. Cl. .................................. 73/861.24; 73/720; 73/DIG. 4
[58] Field of Search ................ 73/861.22, 861.24, 720, 73/DIG. 4; 310/338

[56] References Cited

U.S. PATENT DOCUMENTS

| | | | |
|---|---|---|---|
| 4,258,565 | 3/1981 | Sawayama et al. | 73/DIG. 4 |
| 4,262,544 | 4/1981 | Herzl | 73/861.24 |
| 4,437,350 | 3/1984 | Tamura et al. | 73/861.24 |
| 4,475,405 | 10/1984 | Corpron et al. | 73/720 |
| 4,526,040 | 7/1985 | Matsubara | 73/861.24 |
| 4,559,832 | 12/1985 | Burlage et al. | 73/DIG. 4 |
| 4,776,222 | 10/1988 | Lew | 73/861.22 |
| 4,862,750 | 9/1989 | Nice | 73/861.24 |

Primary Examiner—Herbert Goldstein
Attorney, Agent, or Firm—Michael L. Sheldon

[57] ABSTRACT

A vortex sensor 14 for measuring a flow rate of a fluid flowing through a flow passage. The flow rate is measured by detecting alternating pressure variations 26a and 28a generated by a shredding body 16 placed in the flow passage. The vortex sensor 14 includes a sensor housing 32 having two cavities 44 and 46 interconnected by a channel 42. An Axle 52 of a spool member 34 is slideably disposed in the channel 42 and allows each of two flange members 54 and 56, connected proximate each end of the axle 52, to shuttle back and forth with respect to the sensor housing 32. A piezoelectric sensing element 62, 64 and a biasing mechanism 58, 60 are disposed between the flange members 54 and 56 and the sensor housing 32. The alternating pressure variations are applied to each flange member 54, 56 causing the spool member 34 to shuttle back and forth. When the spool 34 moves, mechanical forces are coupled to each sensing element 62 and 64 by biasing mechanisms 58 and 60. Circuitry 78, interconnected to the sensing elements 62 and 64, detects signals generated by the sensing elements as a result of forces applied to them.

27 Claims, 6 Drawing Sheets

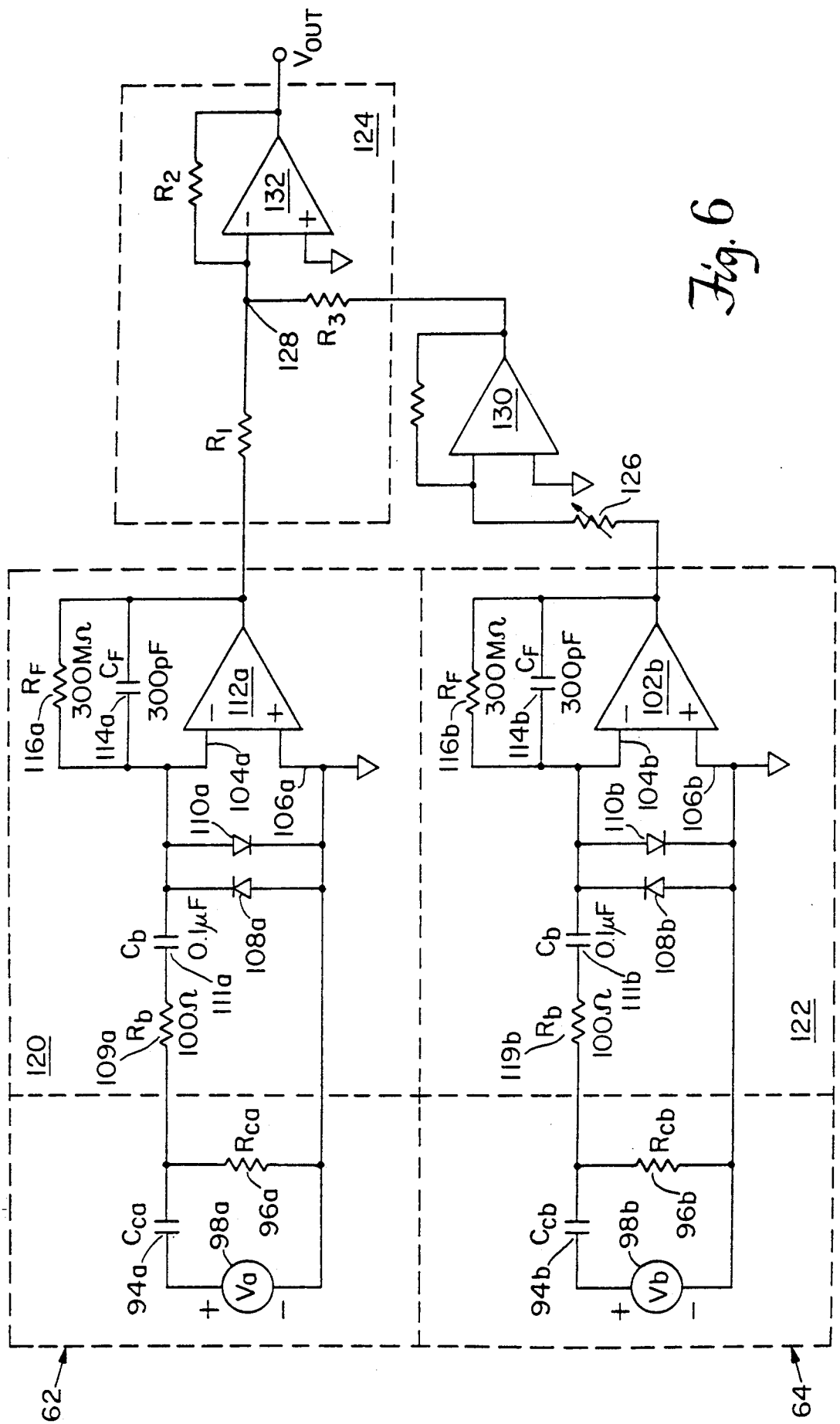

PIEZOELECTRIC DIFFERENTIAL PRESSURE VORTEX SENSOR

FIELD OF THE INVENTION

The present invention relates to sensors for vortex shedding flowmeters and more particularly to piezoelectric vortex sensors.

BACKGROUND OF THE INVENTION

Conventional vortex shedding flowmeters include a bluff body or shedder placed in a fluid for generating alternating vortices downstream of the shedder, a phenomenon known as a Von Karman vortex street. The frequency and amplitude of these vortices are typically detected and measured by pressure sensors in order to determine the mean flow velocity. The frequency of the generated vortices is linearly proportional to the mean flow velocity, and the amplitude of the pressure pulse is proportional to the square of the flow velocity times the fluid density.

Sensors used to detect the vortices often include diaphragms which fluctuate in response to alternating pressure variations generated by the vortices. For example, in U.S. Pat. No. 3,948,098 to Richardson et al., pressure applied to the diaphragms is transferred to a piezoelectric bimorph device sealed within a sensor housing via an electrically non-conductive hydraulic fill fluid. These type of sensors, however, cannot be used for measuring the flow velocity of extreme temperature fluids, because of the temperature limitations of the fill fluid, and the piezoelectric bimorph.

Meters used for measuring high temperature fluids, such as steam, are constructed without fill fluids. These meters include a shedder in the fluid flow path which oscillates or vibrates as vortices are "shed" from opposite sides thereof. These vibrations induce bending moments which are detected by a pair of sensors hermetically sealed in the vortex shedder. An example of this type of meter is shown and described in U.S. Pat. No. 4,437,350 to Hisashi Tamura, et al.

Since these devices rely on the detection of vibrations of the shedder, the sensors are made to be highly sensitive for detecting slight oscillations. This high sensitivity coupled with the very large mass of the shedder (approaching 500 grams in larger meters), however, makes them adversely susceptible to mechanical vibrations transmitted through the pipe and the shedder. To eliminate this noise, the sensors in the patent to Tamura above consists of two piezoelectric sensing elements which are both electrically divided with respect to the neutral axis of the shedder for symmetrically dividing the oscillations into tensile and compression stress components. In essence, the sensing elements act as if there were four independent sensing elements. Complicated circuitry is then required to compare the signals from each piezoelectric element for cancelling out the vibration and common mode noise components of the signal.

SUMMARY OF THE INVENTION

It is therefore an object of the present invention to provide an improved piezoelectric vortex sensor that is insensitive to mechanical vibration and common mode pressure pulsations.

It is a further object of the present invention to provide a piezoelectric vortex sensor which transmits vortex pressure variations to a piezoelectric detector without requiring a fill fluid or a vibrating shedder.

It is yet a further object of the present invention to provide a replaceable piezoelectric vortex sensor.

An advantage of the present invention is that simple electronic circuitry is required for detecting signals that result from pressure variations applied to the piezoelectric detector.

Another advantage of the present invention is that it is a simple mechanical structure that is capable of detecting small pressure fluctuations at extreme temperatures.

This invention results from the realization that a low mass, piezoelectric vortex sensor which transfers vortex pressure variations to a sensing element can be manufactured by sandwiching a piezoelectric crystal between each side of a sensor housing and a flange of a spool-like actuator. When the actuator shuttles back and forth in response to alternating vortices, different compressional forces are exerted on the crystals. These forces cause the crystals to generate signals which are indicative of passing vortices.

This invention features a piezoelectric vortex sensor which includes a sensor housing having a first and second cavity interconnected by a channel. A spool-like actuator, having an axle and a flange member connected proximate to each end of the axle, is slideably disposed in the channel of the sensor housing for allowing each of the flange members to shuttle back and forth in response to alternating vortex pressure variations. Piezoelectric sensing means are disposed between the flange members and the sensor housing for generating signals in response to forces mechanically applied to them. Means for detecting signals are interconnected to the sensing means for detecting the generated signals.

In a preferred embodiment, the means for detecting preferably comprises a charge amplifier for detecting signals generated by the sensing means. In the alternative the means for detecting can include a charge amplifier interconnected to each sensing means for detecting the generated signals and a summing circuit for combining the output signals of each amplifier to reduce common mode noise. Further, the piezoelectric sensing means is a lithium niobate piezoelectric crystal. The vortex sensor can include diaphragm means for interconnecting each flange member to the sensor housing thereby sealing the cavities and a bias means, disposed in each cavity, for coupling the forces applied to each flange member to the sensing means. The bias means may further include spring means, preferably a Belleville washer, for uniformly biasing an insulating disk against the piezoelectric sensing means.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed on illustrating the principles of the invention.

FIG. 6 is a schematic diagram of another alternate circuit used to detect variations in charge of the piezoelectric sensor.

DETAILED DESCRIPTION OF THE INVENTION

The present invention utilizes a low-mass, piezoelectric vortex sensor which is removably placed in a meter body having a shedder placed across the path of a fluid flow to generate alternating vortices. The sensor includes a spool-shaped actuator that shuttles back and forth with respect to a sensor housing when exposed to the alternating vortices. The sensor further includes a piezoelectric crystal and a bias mechanism sandwiched between each side of the sensor housing and a flange of the actuator. When pressure forces the actuator to shuttle to one side of the sensor housing, stress on one crystal is increased and on the other crystal is relaxed. Each crystal generates signals as a result of this stress which are detected by a charge amplifier. The charge amplifier produces an output voltage that is used to determine the frequency of the generated vortices. While the description the preferred embodiment is directed to a high temperature vortex meter, it will be understood by one skilled in the art that the described vortex meter can be used for all temperature applications including cryogenic applications.

Figure 1:
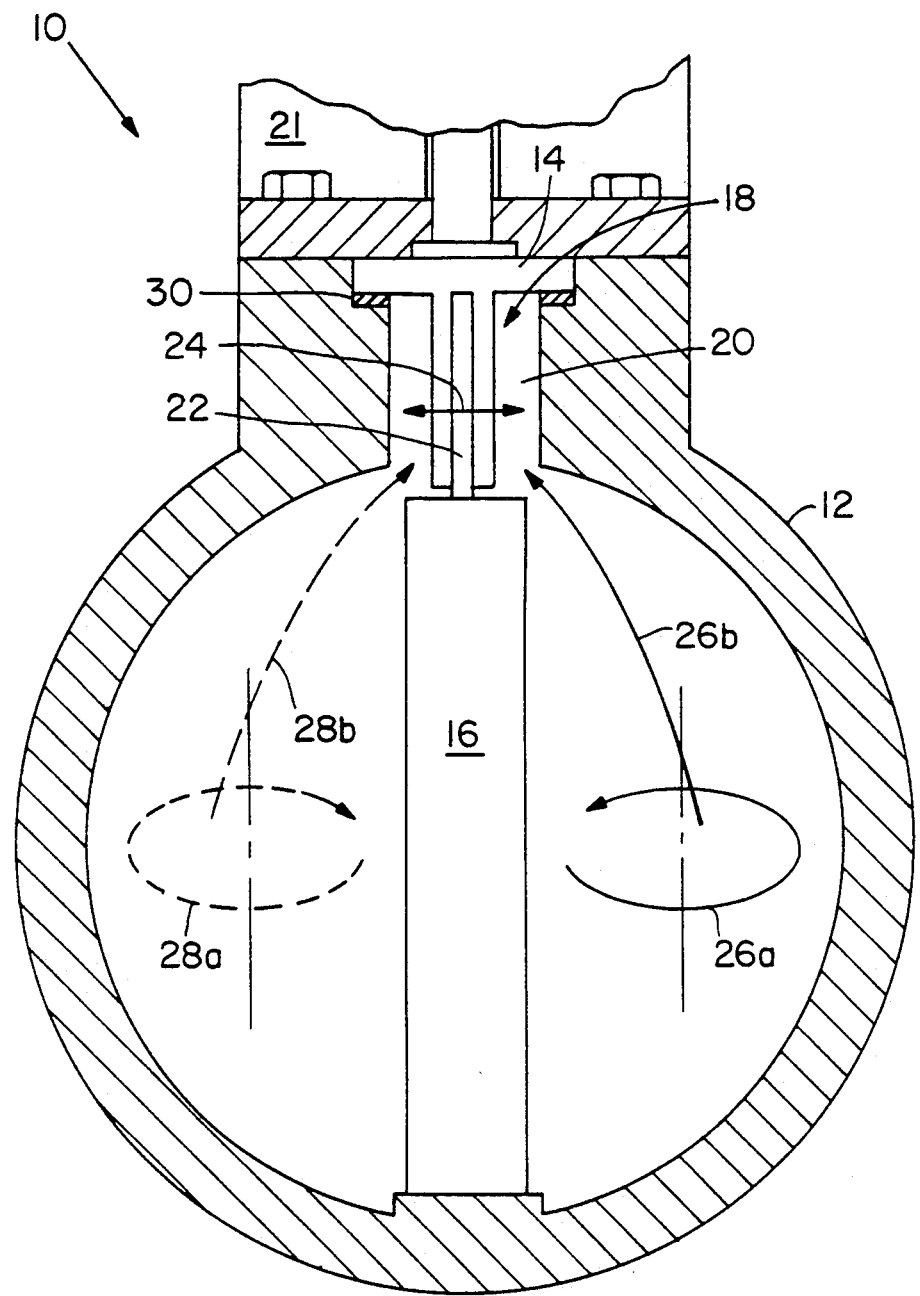
FIG. 1 is a cross-sectional view of a piezoelectric vortex sensing meter having a vortex shedder placed in a fluid flow passage for generating alternating vortices and a replaceable piezoelectric vortex sensor constructed according to the principles of this invention for detecting the alternating vortices.

Referring now to FIG. 1, the present invention includes a vortex shedding meter 10, which primarily consists of a meter body 12, a piezoelectric sensor 14, and a shedder body 16. The piezoelectric vortex sensor 14 extends through a cylindrical opening 18 of meter body 12 and against vortex shedder 16. Sensor 14 is secured in place by a cap 21 bolted to meter body 12. This construction permits sensor 14 to be easily replaced, if it becomes damaged. Sensor 14 divides a fluid cavity 20, defined by opening 18, into two halves. A gasket 22, which is preferably made of suitable high-temperature material, creates a seal between the walls of fluid cavity 20 and shedder 16.

The sensor is oriented such that its sensing direction is perpendicular to shedder 16 (as indicated by a double headed arrow 24) and along the direction of fluid flowing and through meter body 12 (for example into the pipe). This orientation permits sensor 14 to detect the alternating pressure signals 26b and 28b caused by vortices 26a and 28a. As suggested by solid arrows 26a and 26b and the dashed arrows 28a and 28b, the pressure signals are alternately transferred to each half of fluid cavity 20 and are 180 degrees out of phase with each other. A second gasket 30, preferably made of high-temperature material, is secured between sensor 14 and meter body 12 to prevent external leakage of fluid.

Figure 2:
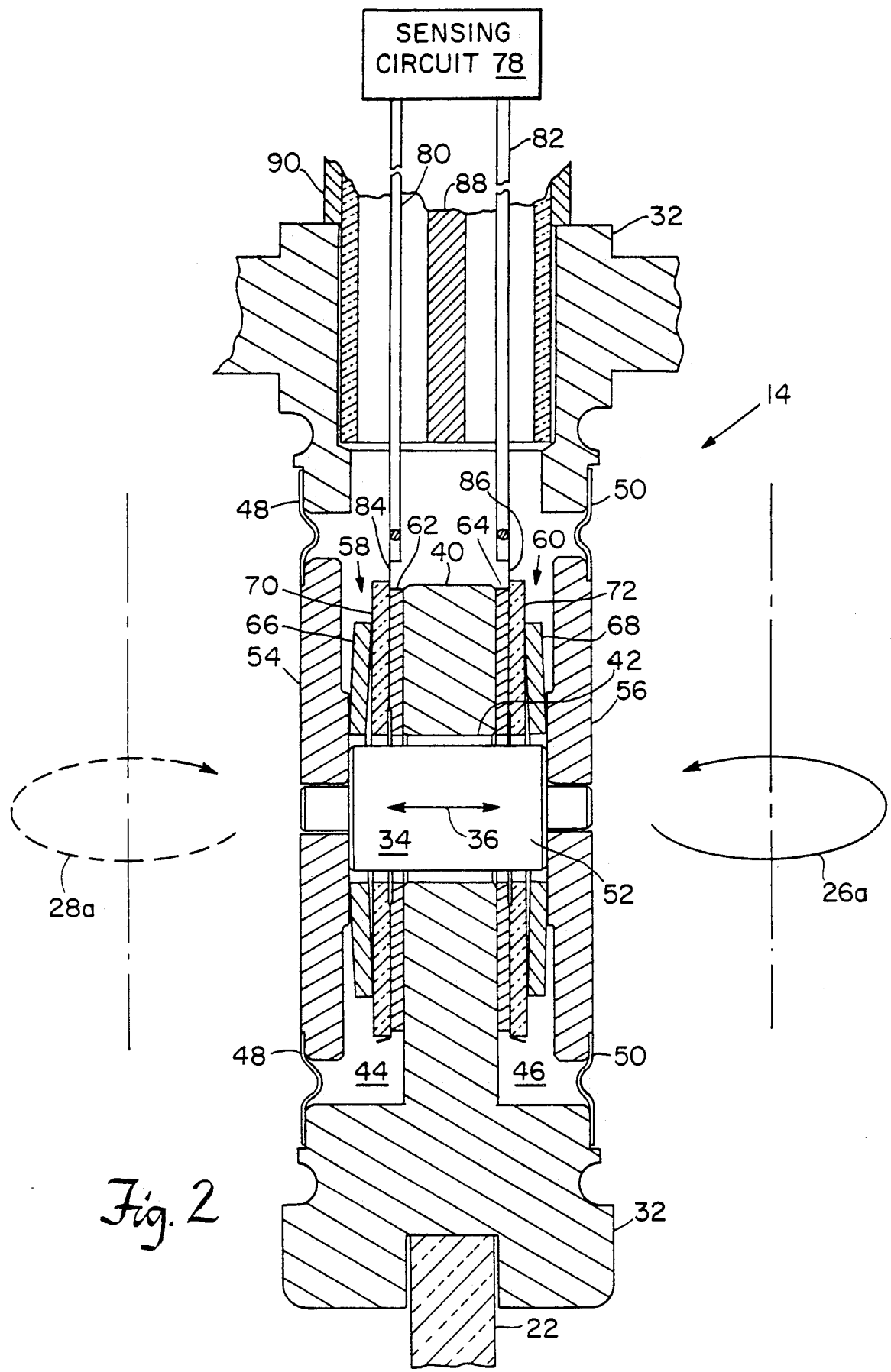
FIG. 2 is an enlarged cross-sectional view of the piezoelectric vortex sensor shown in FIG. 1.
Figure 3:
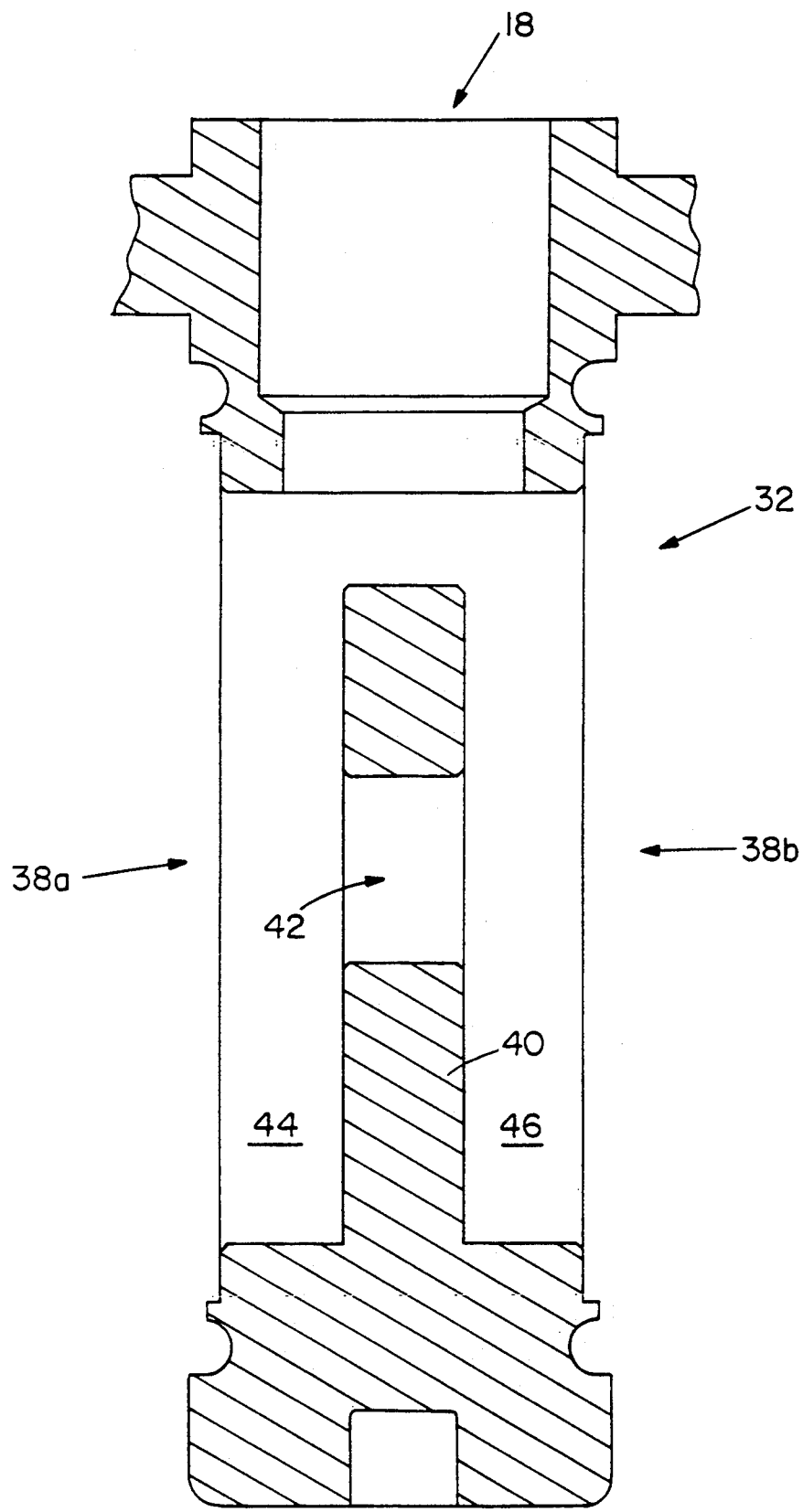
FIG. 3 is a perspective view of the sensor housing shown in FIG. 2.

A more detailed drawing of sensor 14 is shown in FIGS. 2 and 3. Sensor 14 includes a sensor housing 32 and a spool-like actuator 34 which shuttles back and forth, as indicated by arrow 36, in response to alternating vortices Both sensor housing 32 and actuator 34 are constructed from high temperature, low corrosive materials, such as stainless steel. The active parts of sensor 14 are contained by sensor housing 32 and are designed to have a low mass. The importance of designing the active parts so that they have a low mass will be discussed in greater detail below.

In the preferred embodiment, sensor housing 32 is fabricated by boring cylindrical bores 38 (FIG. 3), which are approximately 1.3 centimeters in diameter, on each side of sensor housing 32 leaving a center member 40 having a channel 42. Two cavities 44 and 46, each approximately 2 millimeters deep, are thereby formed. Actuator 34, which primarily consists of an axle 52 and flanges 54 and 56 connected at each end of axle 52, is positioned within bores 38 and held in place by diaphragms 48 and 50 (FIG. 2). Axle 52 is sized to be slideably disposed within channel 42 to permit flanges 54 and 56, to shuttle back and forth within cavities 44 and 46. Flanges 54 and 56 are approximately 11 millimeters in diameter and 2 millimeters thick. Diaphragms 48 and 50, approximately 75 micrometers thick and are sufficiently flexible to allow actuator 34 to shuttle back and forth in response to vortex pressure The diaphragms hermetically seal each cavity 44 and 46 from the flow of fluid in meter body 12.

Sandwiched between each flange 54, 56 and center member 40 is a piezoelectric sensing element 62, 64 and biasing mechanism 58, 60. Sensing elements 62 and 64 are preferably lithium niobate piezoelectric crystals, which are Z cut. The advantages of using a lithium niobate piezoelectric crystal over other types of crystals is its ability to remain piezoelectrically active while continuously operating at high temperatures such as 800 degrees F (Their Cure temperature is 2102 degrees F.). According to the preferred embodiment, both crystal polarities are facing the same direction. In other words, the positive face of one crystal and the negative face of the other crystal are in contact with center member 40 which serves as both an electrical and mechanical ground. When assembled in this manner, both crystals produce the same polarity signal for a flow signal which shuttles actuator 34 back and forth as indicated by arrow 36. This will be discussed in greater detail below.

Biasing mechanisms 58 and 60 preferably consist of Belleville washers 66 and 68 made of suitable spring alloy for high temperatures and insulating disks 70 and 72, preferably made of ceramic. Bias mechanisms 58 and 60 serve to uniformly apply compressive force on each sensing element 62 and 64 to keep all of the pieces of the sensing mechanism in intimate contact with each other. Other suitable biasing means can also be used. For example, a helical spring may be used in place of the Belleville washer.

Crystals 62 and 64 are placed in sensor housing 32 with one face in electrical contact with center member 40 which serves as both the electrical and mechanical ground for the sensor mechanism. Sensing circuitry 78 is connected to the crystals via leads 80 and 82 which are connected to foil discs 84 and 86. Foil discs 84 and 86 are disposed between insulators 70 and 72 and sensing crystals 62 and 64, and are kept in contact with the crystals by bias means 66 and 68. Foil disks 84 and 86 are approximately 11 mm in diameter and 50 micrometers thick.

Sensing circuitry 78 is preferably located remotely from sensor body 14 to protect it from extreme temperatures. As shown, electrical leads 80 and 82 are rigidly supported by a dual bore ceramic tube 88. Ceramic tube 88 is encased by a stainless steel extension tube 90 which is welded leak tight to sensor housing 32. Leads 80 and 82 can be brazed or welded to a ceramic to metal electrical feedthrough (not shown) welded leaktight to the extension tube. This allows the sensor to be evacuated and filled with a dry gas for preventing degradation of the sensor.

During operation of the meter, vortices generated by shedder 16 apply an alternating differential pressure across the two sides of the sensor 14. As a result, actuator 34 shuttles back and forth (as indicated by arrow 36) causing one Belleville washer to further compress slightly while simultaneously relaxing the other slightly. This in turn creates an increasing stress on one crystal while simultaneously decreasing the stress on the other. These alternating stress variations cause alternating charges to be generated at the faces of each crystal which are measured by sensing circuitry 78.

An important feature of this sensor construction is that it is insensitive to line pressure fluctuations such as those commonly caused by pump impeller rotation These pressure fluctuations travel down the pipe at sonic velocities and arrive at both sides of the sensor simultaneously and are referred to as common mode noise. These pressure fluctuations can be substantially greater than the alternating differential pressure signals created by vortex shedding, particularly at low flow rates. If the sensor were affected by common mode pressure fluctuations, an erroneous readout could result. Since the two diaphragms 48 and 50 have essentially the same effective area and are coupled to each other via spool-like actuator 34, pressure fluctuations which arrive simultaneously at both sides of sensor 14 create no net force on crystals 62 and 64. In other words, equal and opposite forces are generated and no motion of the shuttle occurs. As a result, no additional stresses are transferred to the crystals and no charges are generated by either crystal.

Common mode signals could also cause very slight and simultaneous bending of both spool flanges 54 and 56, resulting in a simultaneous increase (or decrease) in stress on both crystals. Since the stress on both crystals is changing in phase (whereas the stresses created by vortices 26 and 28 are changing 180 degrees out of phase) the resulting signal can be electronically cancelled.

A sensor constructed in this manner is also inherently insensitive to mechanical vibrations. Lateral pipe vibrations (vibration that is parallel to the shuttle direction of the sensor) are not an important factor because the sensor has a very small active mass (approximately 2 grams). For example, a "1 g" vibration produces a 2-grams lateral force, which is less than the force produced by vortex shedding at flow ranges of interest. The sensor is insensitive to vibrations either along the flow direction or in the vertical direction because in addition to the very small sensor mass, these vibrations create shear stress on the crystals and crystals polarized through their thickness are insensitive to shear stress.

Signals can be generated, however, by both crystals when a common mode pressure signal, such as that arising from pulsating flow, is applied to the sensor. These signals can occur only if the mechanical characteristics of the sensor are less than ideal. The mechanical response can be of two forms. First, due to the lack of symmetry of a sensor, the crystals can be compressed or relaxed unequally. For example, one of the diaphragms may be more flexible or have a larger surface area than the other and may therefore be more sensitive to pressure variations. These types of symmetry variations result in differential pressures that are similar to forces arising in the vortex field when flow is present. These signals can not be distinguished from the flow signal. Therefore, symmetry is an important consideration during the manufacture of the sensor.

The second type of mechanical response that can occur is due to the non-rigidity of actuator 34 which could cause compression on both crystals to be increased or relaxed simultaneously. In other words, each flange, 54 and 56 could bend or the axle could be compressed under pressure. Electronically, this type of response can be distinguished and eliminated from the signals generated by shedding vortices because the two crystals will produce small signals of opposite polarity. The preferred circuitry for eliminating these signals is discussed in greater detail below.

Figure 4:
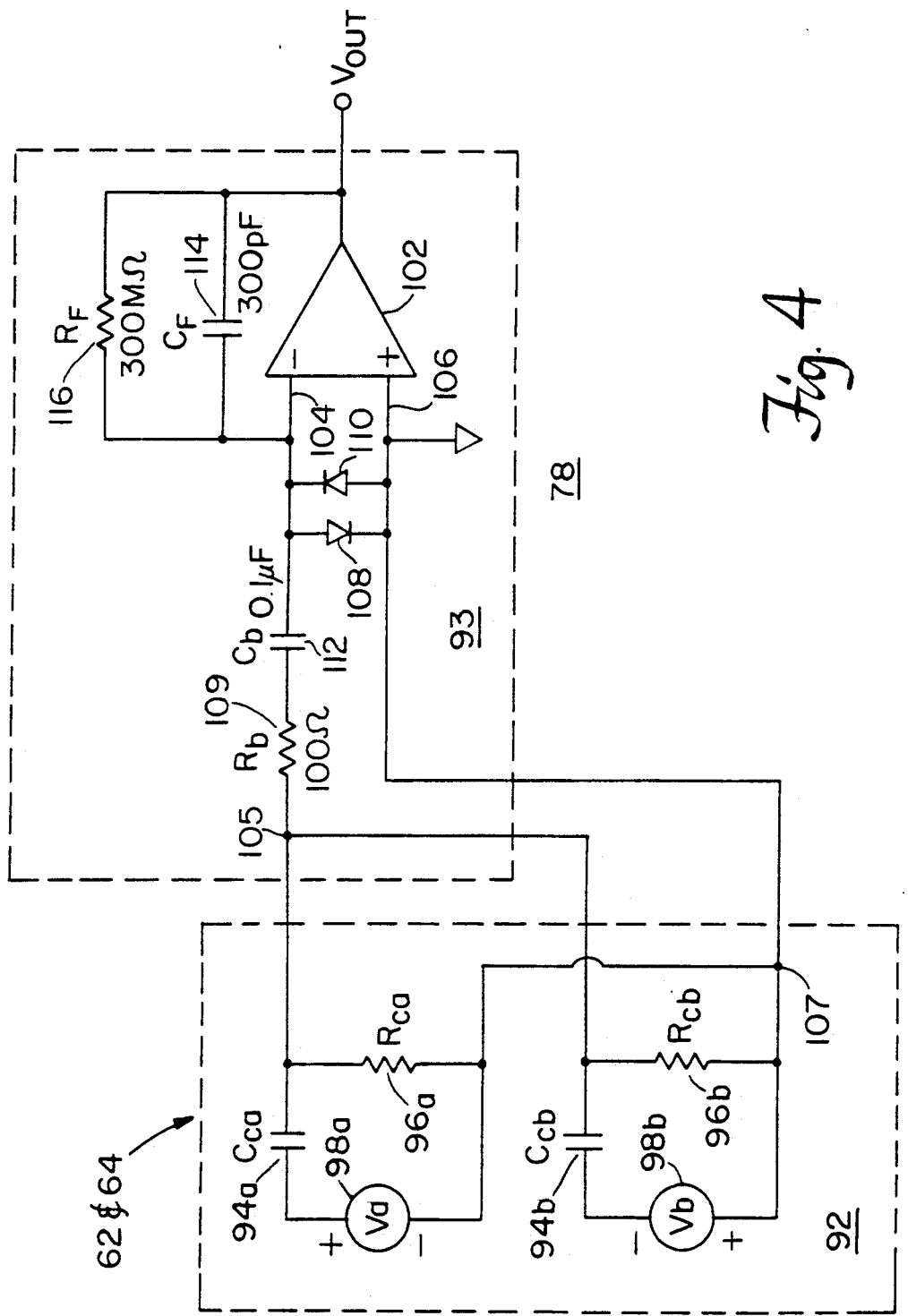
FIG. 4 is a schematic diagram illustrating circuitry used to detect charge variations in the piezoelectric sensor of FIG. 2, which are generated in response to pressure variations transmitted to the sensor by the vortex shedder.

The preferred circuitry 78 for detecting vortices is shown in FIG. 4. This circuitry shows a circuit 92 which is an electrical equivalent of the crystals and a charge amplifier 93. As shown, this approach requires that the two piezoelectric crystals be mounted so that the polarities of the two crystals in contact with center member 40 are opposite, as discussed above. This insures that when both crystals are simultaneously compressed or relaxed the charge developed across the crystals, as detected by electrodes 80 and 82, will be equal in magnitude (if the crystals are identical and the mechanical components symmetric), but opposite in sign.

Circuit 92 includes crystal capacitors 94a and 94b and crystal resistance 96a and 96b connected in series with voltage sources 98a and 98b for each crystal. Charge amplifier 93 includes an operational amplifier 102 having a negative terminal 104 interconnected to a node 105 between crystal resistances 96a, 96b and capacitors 94a, 94b. A positive terminal 106 of operational amplifier 102 is interconnected to a node 107 between crystal capacitor 94a, 94b and resistors 96a, 96b and tied to ground. Two diodes 108 and 110 are connected between terminals 104 and 106, as shown to limit the magnitude of the signals reaching the input terminals of amplifier 102. Charge amplifier 93 also includes a feedback loop, which includes a feedback capacitor 114 and a feedback resistor 116.

Since operational amplifiers characteristically have a small dc potential at its input, referred to as its zero offset voltage, operational amplifier 102 will attempt to force a constant current to flow through feedback capacitor 114. If a constant current were allowed to flow through feedback capacitor 114, the voltage across it would increase linearly with time. Eventually, this voltage will cause the output of the operational amplifier to saturate. This condition is avoided by feedback resistor 116, which is placed in parallel with feedback capacitor 114. This resistor provides an alternative path for this constant current. As a result, the voltage across the feedback loop is a small fixed value which is independent of time. A resistor 109 and a capacitor 112 are connected in series between node 105 and negative terminal 104 to limit the gain of the circuit at high and low frequency.

The charge amplifier is necessary to detect electrical responses from the lithium niobate crystals because characteristically they have very low capacitance. For example, these crystals have a dielectric constant of approximately 30, as compared to PZT5A piezoelectric crystals, which have a dielectric constant, at room temperature of approximately 1700. Further, tests have indicated that the resistance of these type of crystals drops off sharply as temperature increases. Therefore, using a voltage amplifier would be impractical. At very high frequencies and low temperatures the full crystal voltage would appear across the amplifier. At low frequencies, and/or high temperatures, most of the crystal voltage would appear across its capacitor and not across the input to the voltage amplifier.

Charge amplifier 93 operates by maintaining negative terminal 104 of operational amplifier 102 at a potential close to ground As a result, there is essentially no potential difference across crystal resistors 96a and 96b. The charge that appears across the crystals due to an applied stress is nullified by charge flowing from the feedback capacitance 114 to force the potential at negative terminal 104 close to ground.

When differential pressure generated by alternating vortices forces the actuator to shuttle to one side of the sensor housing, increasing stress on one crystal while relaxing the stress on the other crystal, a positive or negative net charge develops at node 105. Charge amplifier 93 senses this net charge and cancels it by delivering an equal and opposite charge to the crystals. As a result, operational amplifier 102 generates an output voltage (Vout) that is proportional to the net charge across the crystals. The frequency of this voltage signal is then measured to indicate the frequency of the vortices.

Ideally, signals generated by the two crystals as a result of a common mode pressure signal are completely eliminated, if the mechanical and electrical components are symmetric, by simple subtraction or cancellation at node 105. For an asymmetrical sensor, the net common mode signal at node 105 is significantly reduced.

Figure 5:
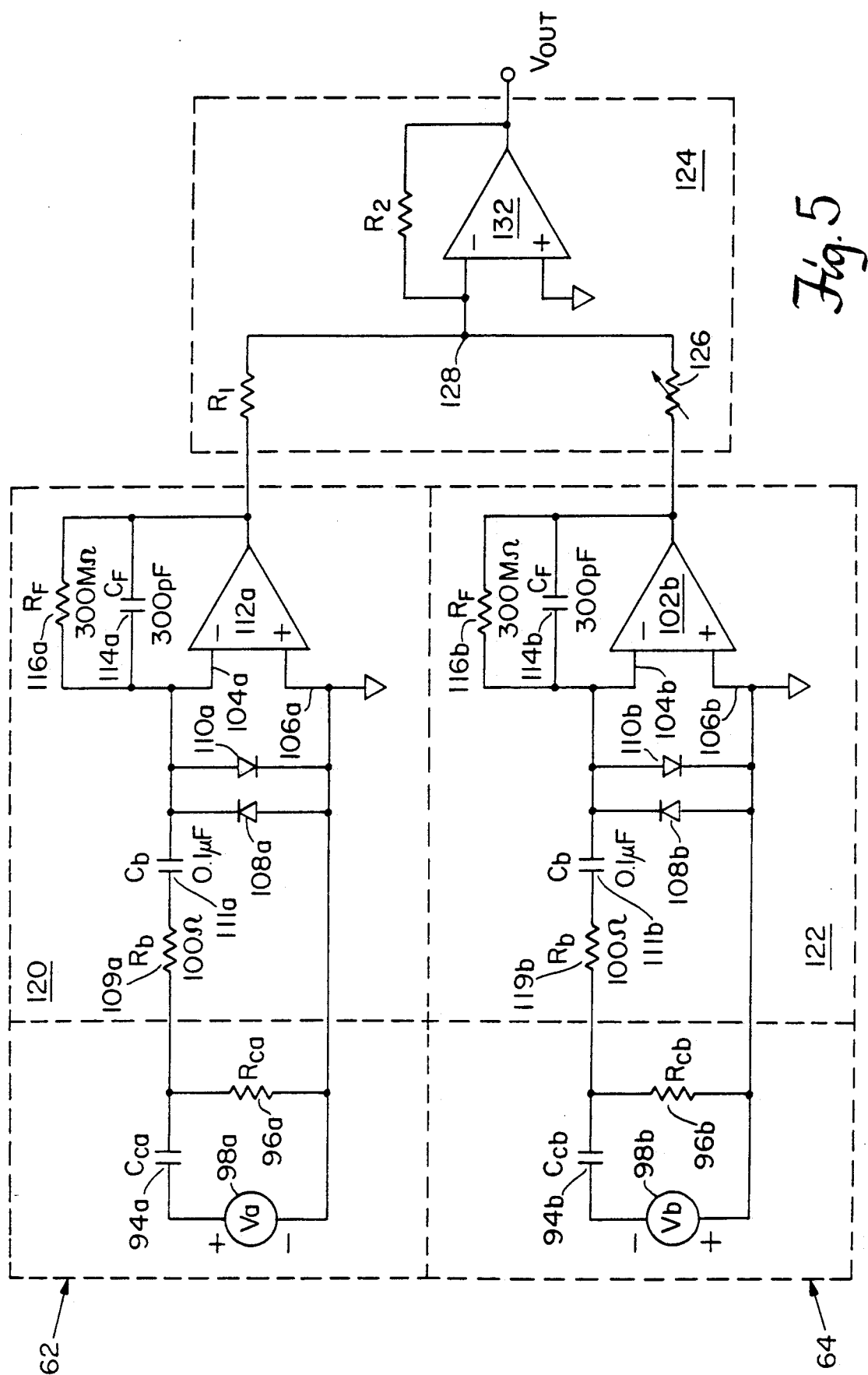
FIG. 5 is a schematic diagram of an alternate circuit used to detect variations in charge of the piezoelectric sensor.

In the event the rigidity of the actuator is not sufficiently high, and if, in addition asymmetries in the mechanical and electrical components of the sensor exist, the electrical responses from the two crystals in the presence of a common mode pressure signal may not be sufficiently equal in magnitude to allow for elimination by cancellation as outlined above. As shown in FIG. 5, this problem can be solved by employing two charge amplifiers 120 and 122, one for each crystal. Note that charge amplifiers 120 and 122 are essentially equivalent to charge amplifier 93, as shown in FIG. 4, and that the crystals are mounted in a similar manner as described above, i.e. the polarities of the two crystals with respect to center member 40 are opposite. The common mode noise resulting from these asymmetries is eliminated by adjusting the relative value of the amplifier outputs, using an adjustable resistor 126 of a summing circuit 124, to equalize the output signals of charge amplifiers 120 and 122 prior to cancellation at node 108. Summing circuit 124, which includes an amplifier 132, is a common circuit known to one skilled in the art.

In the above implementation (FIG. 5), the sensor could be assembled with common polarities of the two crystals in contact with center member 40 as shown in FIG. 6. This circuit would then require an inverter 130 to invert the signal generated by one of the crystals before summing the signals together as described above.

While this invention has been particularly shown and described with reference to preferred embodiments thereof, it will be understood by those skilled in the art that various changes in form and details may be made without departing from the spirit and scope of the invention as defined in the appended claims. For example, other piezoelectric crystal such as tantalate or quartz crystals, or piezoelectric ceramics are sensing elements which may be used depending on the application. For these crystals the use of a voltage amplifier circuit may be desirable to detect signals generated by the crystals. Further, it will be understood by one skilled in the art that the shuttle design of the sensor could be fabricated with only one piezoelectric element. Due to asymmetries in the sensor, however, the common mode rejection ratio would not be as great as with two elements as described in the preferred embodiment.

What is claimed is:

1. A piezoelectric differential pressure sensor comprising:
   a sensor housing having a first and second cavity interconnected by a channel;
   a spool-like actuator having an axle slideably disposed in the channel for allowing each of two flange members, connected proximate to each end of the axle, to shuttle back and forth relative to said sensor housing in response to forces applied to the flange members;
   piezoelectric sensing means disposed in the first cavity between the flange member and the sensor housing, for generating signals in response to force mechanically applied to it by the flange members of said actuator; and
   means, interconnected to said sensing elements, for detecting the signals generated by said sensing means.

2. The sensor as claimed in claim 1, further including a second piezoelectric sensing means disposed in the second cavity between the flange member and the sensor housing.

3. The sensor as claimed in claim 1 further including diaphragm means interconnecting each flange member to said sensor housing for sealing said cavities.

4. The sensor as claimed in claim 1, further including bias means, disposed between said flange members and said sensing means, for coupling forces applied to each flange member to said sensing means.

5. The sensor as claimed in claim 4 wherein the bias means include spring means for uniformly biasing a disk against said piezoelectric sensing means.

6. The sensor as claimed in claim 5 wherein said spring means is a Belleville washer.

7. The sensor as claimed in claim 1 wherein said piezoelectric sensing means is a lithium niobate piezoelectric crystal.

8. The sensor as claimed in claim 1 wherein said means for detecting include a charge amplifier for detecting the signals generated by said piezoelectric sensing means.

9. The sensor as claimed in claim 1 wherein said means for detecting include means for combining the signals generated by said sensing means for canceling common mode noise.

10. The sensor as claimed in claim 1 wherein said means for detecting include:

a charge amplifier interconnected to each piezoelectric sensing means for detecting the signals generated by each of said piezoelectric sensing means; and a summer circuit for combining the output signals of each amplifier to reduce common mode noise.

11. The sensor as claimed in claim 1 wherein said sensor housing is made of non-corrosive material.

12. The sensor as claimed in claim 1 wherein said spool member is made of non-corrosive material.

13. A differential pressure sensor for a vortex-shedding flowmeter for measuring a flow rate of a fluid flowing through a flow passage by detecting alternating pressure variations generated by a shedding body placed in the flow passage, said sensor comprising:

a sensor housing having a first and second cavity interconnected by a channel;

a spool member having an axle slideably disposed in the channel for allowing each of two flange members, connected proximate each end of the axle, to shuttle back and forth with respect to said sensor housing;

diaphragm means for interconnecting each flange member to said sensor housing for sealing said cavities;

piezoelectric sensing means disposed in the first cavity between the flange member and said sensor housing, for generating a signal in response to a mechanical force applied to each sensing means;

bias means, disposed in each cavity of the flange members for coupling forces applied to each flange member to said sensing means; and means, interconnected to said sensing means, for electronically detecting the signal generated by said sensing means in response to said spool member shuttling back and forth as a result of mechanical forces on said flange members caused by pressure variations generated by the shedding body and transmitted to the sensor means by said bias means.

14. The sensor as claimed in claim 13, further including a second piezoelectric sensing means disposed in the second cavity between the flange member and the sensor housing.

15. The sensor as claimed in claim 13 wherein said means for detecting include means for combining the signals generated by said sensing means for canceling common mode noise.

16. The sensor as claimed in claim 13 wherein said means for detecting includes a charge amplifier, interconnected to each piezoelectric sensing means, for detecting the signals generated by each of said piezoelectric sensing means.

17. The sensor as claimed in claim 13 wherein said means for detecting include:

a charge amplifier interconnected to each piezoelectric sensing means for detecting the signals generated by each said piezoelectric sensing means; and a summer circuit for combining the output signals of each amplifier to reduce common mode noise.

18. The sensor of claim 13 wherein said bias means includes spring means for uniformly biasing an insulating disk against said piezoelectric sensing means.

19. The sensor of claim 13 wherein said piezoelectric sensing means comprise a lithium niobate piezoelectric crystal.

20. The sensor as claimed in claim 13 wherein said sensor housing and said spool member are made from high temperature, corrosive resistive material.

21. A vortex sensor for a vortex-shedding flowmeter for measuring a flow rate of a fluid flowing through a flow passage by detecting alternating pressure variations generated by a shedding body placed in the flow passage, said vortex sensor comprising:

a sensor housing having a first and second cavity interconnected by a channel;

a spool member having an axle slideably disposed in the channel for allowing each of two flange members, connected proximate each end of the axle, to shuttle back and forth with respect to said sensor housing;

diaphragm means, interconnected between each flange member and said sensor housing to seal each cavity;

two lithium niobate piezoelectric sensing elements, one disposed in each cavity between said flange members and said sensor housing for generating a signal in response to force applied to it;

bias means, disposed between the flange members and said piezoelectric sensing elements, for coupling pressure variations applied to each flange member to the sensing elements; and means, interconnected to said sensing elements, for detecting signals generated by said sensing elements in response to said spool member shuttling back and forth as a result of mechanical forces on said flange members caused by pressure variations and transmitted to the sensing elements by said bias means.

22. The vortex sensor of claim 21 wherein said bias means includes spring means for uniformly biasing an insulating disk against said piezoelectric sensing element.

23. The vortex sensor of claim 22 wherein said spring means is a Belleville washer.

24. The vortex sensor of claim 21 wherein said sensor housing and said spool member are made from high-temperature, corrosive resistive material.

25. The vortex sensor of claim 24 wherein the high-temperature, corrosive resistive material is stainless steel.

26. The vortex sensor as claimed in claim 21 wherein said means for detecting include means for combining the signals generated by said sensing means for canceling common mode noise.

27. The vortex sensor as claimed in claim 21 wherein said means for detecting include:

a charge amplifier interconnected to each piezoelectric sensing elements for detecting the signals generated by each said piezoelectric sensing elements; and a summer circuit for combining the output signals of each amplifier to reduce common mode noise.

* * * * *